United States Patent [19]
Ycas et al.

[11] Patent Number: 5,717,541
[45] Date of Patent: Feb. 10, 1998

[54] FLEXIBLE CIRCUIT ASSEMBLY FOR DISK STORAGE SYSTEM

[75] Inventors: John A. Ycas, Boulder; Wayne G. Soderfelt, Westminster, both of Colo.; Shoji Samma, Kawasaki, Japan; Gary Kelsic, Longmont, Colo.

[73] Assignee: Fujitsu Limited, Kanagawa, Japan

[21] Appl. No.: 396,864

[22] Filed: Mar. 1, 1995

Related U.S. Application Data

[63] Continuation of Ser. No. 951,903, Sep. 28, 1992, abandoned.

[51] Int. Cl.$^6$ .............................. G11B 21/02; G11B 5/48
[52] U.S. Cl. ...................... 360/97.01; 360/104; 360/106
[58] Field of Search .......................... 360/97.01, 104, 360/106, 97.03, 97.02, 105; 361/636, 749, 789; 24/662, 453, 297

[56] References Cited

U.S. PATENT DOCUMENTS

| | | | |
|---|---|---|---|
| 4,034,411 | 7/1977 | Kraemer et al. | 360/98 |
| 4,397,567 | 8/1983 | Carl | 368/309 |
| 4,422,115 | 12/1983 | Spash | 360/104 |
| 4,476,404 | 10/1984 | Bygdnes | 310/27 |
| 4,716,478 | 12/1987 | Walsh et al. | 360/104 |
| 4,783,705 | 11/1988 | Moon et al. | 360/77 |
| 4,933,785 | 6/1990 | Morehouse et al. | 360/78.04 |
| 4,965,684 | 10/1990 | Stefansky | 360/97.01 |
| 4,985,793 | 1/1991 | Anderson | 360/97.01 |
| 5,005,089 | 4/1991 | Thanos et al. | 360/77.08 |
| 5,012,368 | 4/1991 | Bosier et al. | 360/104 |
| 5,025,335 | 6/1991 | Stefansky | 360/97.01 |
| 5,025,336 | 6/1991 | Morehouse et al. | 360/97.02 |
| 5,029,026 | 7/1991 | Stefansky | 360/97.02 |
| 5,055,969 | 10/1991 | Putnam | 361/398 |
| 5,103,359 | 4/1992 | Marazzo | 360/104 |
| 5,121,273 | 6/1992 | Slezak | 360/108 |
| 5,170,300 | 12/1992 | Stefansky | 360/97.01 |
| 5,212,679 | 5/1993 | Tohkainin | 360/97.02 |
| 5,220,712 | 6/1993 | Taki et al. | 24/662 |
| 5,241,436 | 8/1993 | Kawabata et al. | 360/97.01 |
| 5,270,887 | 12/1993 | Edwards et al. | 360/97.01 |
| 5,276,572 | 1/1994 | Kinoshita et al. | 360/97.01 |
| 5,293,282 | 3/1994 | Squires et al. | 360/97.03 |
| 5,325,252 | 6/1994 | Yagi et al. | 360/97.01 |
| 5,337,202 | 8/1994 | Jabbarai et al. | 360/97.01 |
| 5,357,386 | 10/1994 | Haidari et al. | 360/97.02 |
| 5,375,021 | 12/1994 | Boeckner | 360/97.01 |
| 5,532,889 | 7/1996 | Stefansky et al. | 360/97.01 |

FOREIGN PATENT DOCUMENTS 4132052  5/1992  Japan.

*Primary Examiner*—R. S. Tupper
*Assistant Examiner*—David L. Ometz
*Attorney, Agent, or Firm*—Curtis, Morris & Safford, P.C.

[57] ABSTRACT

A flexlead circuit assembly is provided for use in a rotary disk storage system and is designed so that the inherent bias force exerted by the flexible circuit on the actuator arm of the disk storage system is negated. The flexlead circuit herein is split into two sets of flexlead conductors: one to supply power and ground to the actuator VCM and other to transmit signals to and from the read/write heads. The end of each of these flexlead conductors opposite to the end mounted to the actuator arm is integrally formed with and provides signal communication with a printed circuit mounted within the housing. The printed circuit is formed on a substrate which is snap-fit to the lower plate of the disk drive housing to thereby not only support the printed circuit within the housing, but also to provide mechanical support for the flexlead circuit.

20 Claims, 3 Drawing Sheets

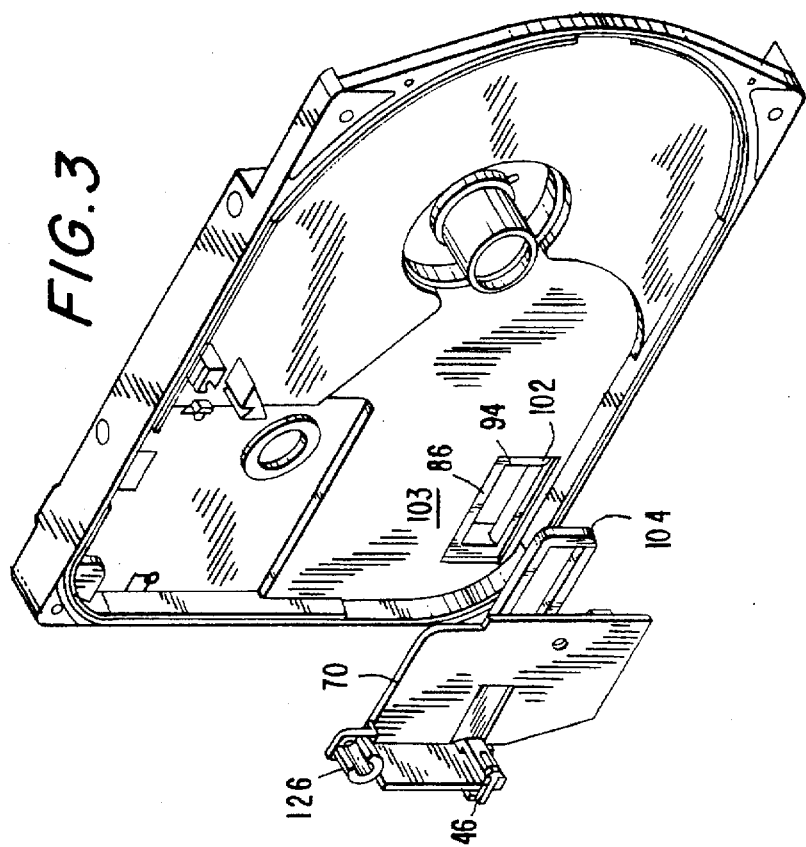
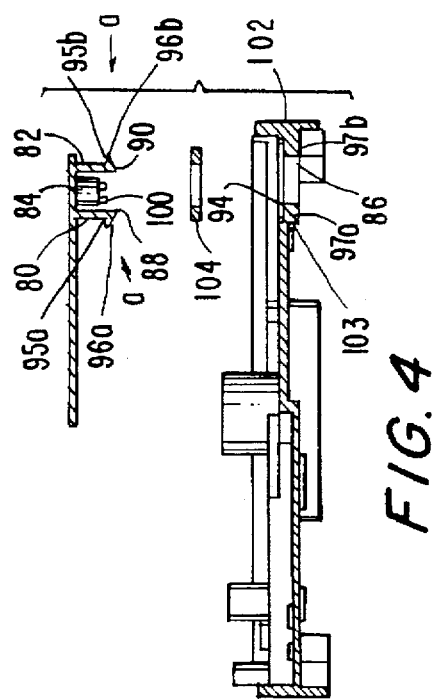
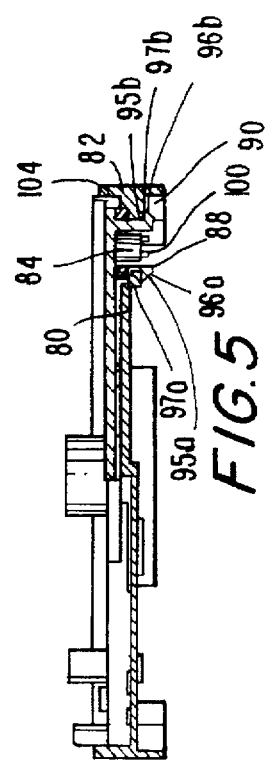

FLEXIBLE CIRCUIT ASSEMBLY FOR DISK STORAGE SYSTEM

This application is a continuation of application Ser. No. 07/951,903, filed Sep. 28, 1992, now abandoned.

FIELD OF THE INVENTION

The present invention is generally directed to disk storage systems, and more particularly, is directed to a flexible circuit assembly for a disk storage system which includes the read/write head electronic circuitry and supplies power and ground to the voice coil motor ("VCM"). The flexible circuit assembly of the present invention is in part formed on a substrate which is snap-fit into the housing of the disk storage system, and also provides mechanical support for a flexlead assembly which is designed to negate the inherent bias force exerted on the actuator carriage by the flexlead assembly.

BACKGROUND OF THE INVENTION

When a rotary actuator is used in a disk storage system, typically a voice coil is employed to pivot the actuator arm so as to position the read/write heads with respect to the recording medium on the storage disk. In this type of disk storage system, a flexible circuit usually is employed to transfer information signals to and from the read/write heads connected to the actuator arm, to connect the read/write heads with servo lines, to provide an electrical ground line and to supply power to the actuator coil.

Prior flexible circuits have attempted to accommodate sufficient signal traces while at the same time have attempted to separate the signal paths to the read/write heads to minimize cross-talk and noise. One example of a flexible circuit that has been connected to the actuator arm in a disk storage system to minimize cross-talk and noise that otherwise would interfere with a servo operation is disclosed in U.S. Pat. No. 5,055,969. As is set forth below, the flexible circuit in U.S. Pat. No. 5,055,969 is disadvantageous as no compensation is provided for reducing, or moreover, negating the inherent mechanical bias force created on the actuator arm by the flexible circuit.

In conventional disk drives, the flexible circuit has one end attached to the actuator arm and the other end attached to a fixed location within the disk drive and is in the form of a loop extending away from the storage disk. The distance between the point at which the flexible circuit is attached to the actuator assembly and the fixed point in the disk drive is limited, and thus the radius of the arc or curve of the flexible circuit is small and the length of the flexible circuit itself is thereby limited. The flexible circuit moves when the actuator arm is pivoted and thus exerts a torque on the rotary actuator arm assembly influencing its movement relative to the disk surface or, in other words, its position relative to the disk track centerline.

In order to eliminate track seeking and following errors, it is desirable to provide a flexible circuit which compensates for the effect of such a torque exerted on the actuator arm. This compensation is complicated, however, due to fact that the torque exerted on the actuator arm by the flexible circuit varies with the position of the actuator arm.

Various methods have been employed to compensate for the effect of the inherent bias force exerted on the actuator arm by a flexlead assembly. In certain disk storage systems, compensating circuitry and servo software are utilized to perform the compensating steps. These methods, however, have been found to be disadvantageous as they increase the cost of the data storage system and decrease the accuracy and reliability of the servo control.

Additionally, various data storage systems have employed varying geometries of a single flexlead to reduce the torque exerted on the actuator arm by the flexlead. In U.S. Pat. No. 4,965,684 the radius of the curve in a single flexlead circuit is made as large as possible (approximately twice as large as conventional flexleads at that time) to minimize the torque exerted on the actuator arm by the flexlead. According to this patent, moving the flexlead in an essentially linear manner when the actuator arm rotates also minimizes torque. It has been found, however, that simply increasing the length of the flexible circuit creates unwanted resonances adversely affecting operation of the disk drive.

In U.S. Pat. No. 4,933,785 a single flexlead assembly is attached near a cam surface assembly and to an actuator arm such that the flexlead is composed of two curved portions having different radii. As described in this patent the two different radii result in a flexible circuit configuration that maintains zero torque application throughout the entire range of motion of the actuator arm assembly. It has been found, however, that employing such dual curved sections in a single flexlead is not conducive to automated assembly as the flexlead must not only be attached to the actuator assembly, but, in addition, securement means must be provided in the disk drive to create the two curved sections.

Moreover, since the end of the flexlead in U.S. Pat. No. 4,933,785 opposite to the end attached to the actuator assembly is mounted directly to the printed circuit board, there is insufficient mechanical support within the disk drive assembly to retain the dual curved sections of the single flexlead in their proper orientation. During use, it has been found that without proper mechanical support, such curved portions of the flexlead suffer or lose their physical integrity. With reduced physical integrity of the flexlead, unwanted torque is exerted on the actuator arm thus leading to track seeking and following errors.

Further, for attachment to the printed circuit board, the end of the flexlead in U.S. Pat. No. 4,933,785 opposite to the end attached to the actuator assembly extends out of the disk drive housing. Without a proper means for sealing the disk drive housing at this location, contaminants can readily enter the housing leading to further track seeking and following errors.

In view of the inherent disadvantages of the single flexlead designs, such as those disclosed in U.S. Pat. Nos. 4,965,684 and 4,933,785, it has been found desirable to provide a flexlead assembly which is split into two sets of conductors (i.e., one to supply power and ground to the VCM and the other for transmitting signals to and from the read/write heads) which balances the inherent bias force exerted on the actuator arm by the flexleads. It has also been found desirable to provide a printed circuit associated with the flexible circuit which provides mechanical support for the flexible circuit so as to retain the flexible circuit in its desired, predetermined orientation within the housing. It has been found further desirable to provide a printed circuit associated with the flexible circuit which is adequately sealed with respect to the disk drive housing and electronic circuit board of the data storage system.

OBJECTS OF THE INVENTION

Therefore, it is an object of the present invention to provide a disk storage system which avoids the above-described deficiencies of the prior art.

It is also an object of the present invention to provide a disk storage system having a flexible circuit which accommodates sufficient signal traces.

It is another object of the present invention to provide a disk storage system and a flexible circuit therefor which negates the effect of torque exerted on the actuator arm by the flexible circuit.

It is a further object of the present invention to provide a disk storage system wherein the flexlead assembly is split into two distinct sets of conductors which balance the inherent bias force created on the actuator arm by the flexlead assembly.

It is a still further object of the present invention to provide a disk storage system having a printed circuit assembly associated with the flexible circuit to provide mechanical support for the flexible circuit.

It is yet another object of the present invention to provide a printed circuit assembly associated with the flexible circuit which is itself reliably retained within the housing of the disk storage system in a predetermined orientation.

It is yet a further object of the present invention to provide a disk storage system having a printed circuit assembly associated with the flexible circuit which is adequately sealed with respect to the disk drive housing and the printed circuit board ("PCB") of the disk storage system.

It is a further object of the present invention to provide a disk storage system having a flexlead assembly and snap-in printed circuit for the read/write electronics and VCM power and ground circuitry which is conducive to automated assembly and is relatively inexpensive.

These and other objects, aspects and features of the present invention will become apparent from the following detailed description of a preferred embodiment thereof taken in conjunction with the accompanying drawings throughout which like reference numerals denote like elements and parts.

SUMMARY OF THE INVENTION

In accordance with an aspect of the present invention, the flexlead assembly and printed circuit associated therewith are utilized in a rotary disk storage system in which the actuator carriage or arm is mounted within a housing for rotary travel in a plane. The actuator carriage pivots so as to position at least one read/write head at a desired track on a magnetic disk. The actuator preferably is of the so-called rotary voice coil motor ("VCM") type and is driven when current flows through the VCM.

In accordance with a general object of the present invention, the flexible circuit of the present invention is designed and mounted within the housing so that the inherent bias force created on the actuator arm by the flexible circuit is negated. In order to separate signal traces, the flexible circuit is split into two sets of flexlead conductors: one to supply power and ground to the VCM and the other to transmit signals to and from the read/write heads. By utilizing a dual flexlead design, the bias force created on the actuator arm by each flexlead is balanced by the bias force created on the actuator arm by the other flexlead.

In order to achieve this balancing effect, the pair of flexleads is mounted in a predetermined orientation to the actuator arm and on opposite sides of the pivot point of the actuator arm. The connection point of the dual flexleads to the actuator arm is such that the flexleads "push" the arm on opposite sides thereof, thereby canceling the force exerted by each and negating the net bias force exerted on the arm to zero.

The end of each flexlead opposite to the end mounted to the actuator arm is integrally formed with and provides signal communication with a printed circuit mounted within the housing. The printed circuit of the flexible circuit is formed on a substrate which is snap-fit to the lower plate of the housing to thereby not only support the printed circuit within the housing, but also provide mechanical support for the flexible circuit.

The substrate includes a plurality of clips extending downwardly therefrom which are received and snap-fit within a receiving opening of the lower plate of the housing to reliably mount the printed circuit within the housing. Each of the clips includes a camming surface which rides against a respective upper edge of the receiving opening to force the clips inwardly toward each other such that each of the clips may extend through the opening. Each of the clips also includes a flanged surface extending laterally outwardly at an upper end of each of the camming surfaces. The flanged surfaces engage a corresponding raised member extending below the lower edge of the receiving opening to snap-fit the substrate to the lower plate of the housing.

In order to prevent contaminants from entering the disk drive environment, the substrate is sealed to the lower plate. In accordance therewith, the lower plate of the housing includes a recessed surface surrounding the receiving opening along the top surface thereof. The recessed surface is contoured to accept sealing means in the form of a gasket pad surrounding the clips of the substrate for sealing the substrate to the lower plate. This gasket pad also provides a biasing force to retain the substrate in a predetermined, fixed position within the housing.

In order to capture and retain the flexleads such that they assume their desired predetermined orientation within the housing, a flexlead damping mechanism is formed integrally with the substrate. The flexlead damping mechanism includes a pair of vertical support members extending upwardly from a support platform of the substrate and a flange member extending upwardly from the support platform which is received between the pair of vertical support members. As a result of this construction, each of the flexleads is captured and retained between the flange member and one of the pair of vertical support members. In order to tightly constrain each of the flexleads between the flange member and one of the pair of the vertical support members, an end of one of the vertical support members includes a clamping member which can be received and retained within a notch formed in the other vertical support member.

BRIEF DESCRIPTION OF THE DRAWINGS

The following detailed description, given by way of example, but not intended to limit the invention solely to the specific embodiments described, may best be understood in conjunction with the accompanying drawings in which:

FIG. 3 is a perspective view illustrating the substrate supporting the flexible circuit of FIG. 1 being received within the receiving opening of the lower plate of the disk drive housing.

FIG. 4 is an exploded elevational view illustrating the snap hinge of the substrate removed from the receiving opening of the lower plate of the housing.

FIG. 5 is a front elevational view illustrating the snap hinge of the substrate fully received within the receiving opening of the lower plate of the housing.

DETAILED DESCRIPTION OF A PREFERRED EMBODIMENT

Figure 1:
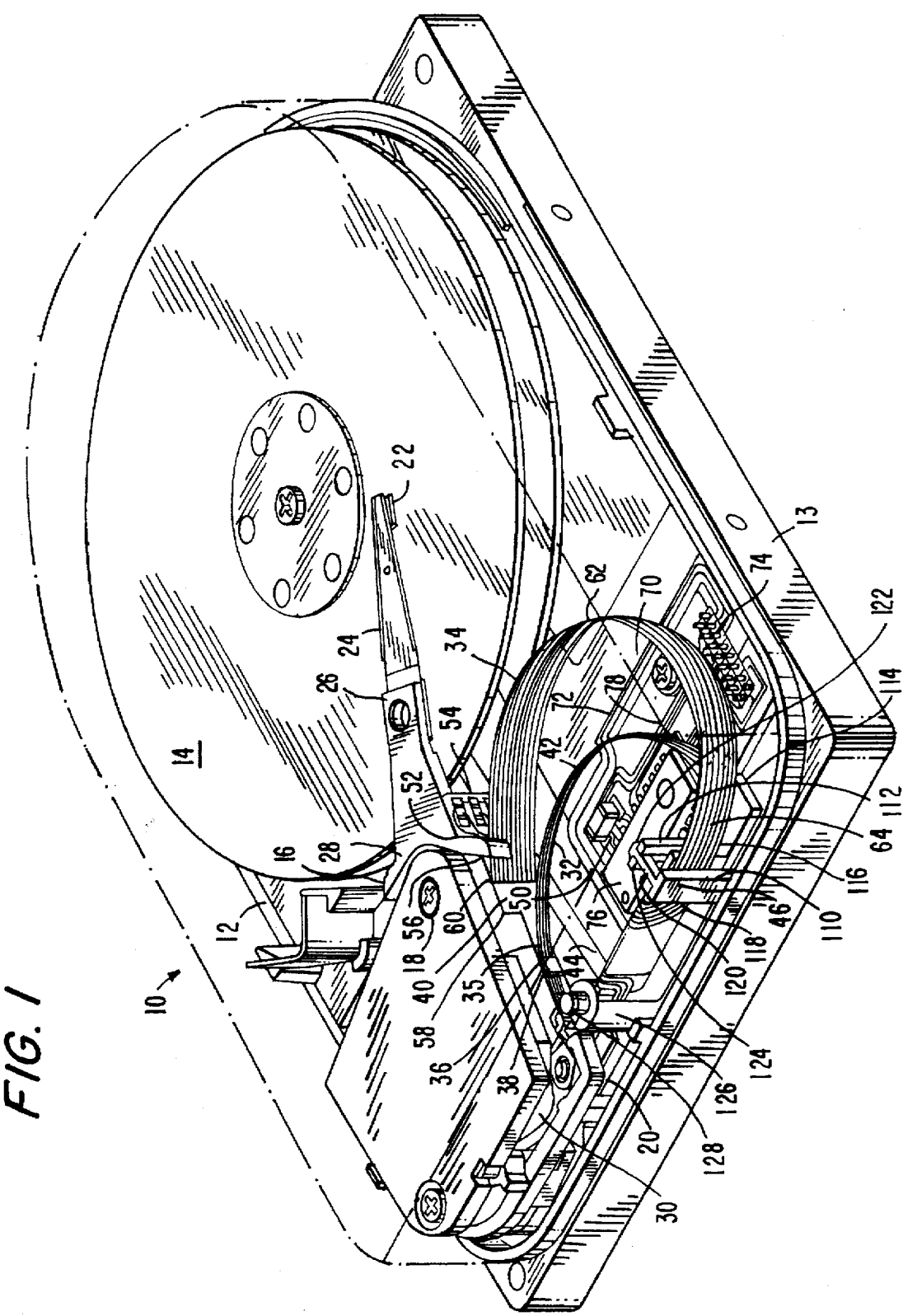
FIG. 1 is a perspective view of a preferred embodiment of the actuator assembly and flexlead circuit of a data storage system incorporating a preferred embodiment of a flexible circuit assembly in accordance with the teachings of the present invention.

Referring now to the drawings and initially to FIG. 1 thereof, a preferred embodiment of the flexible circuit and associated printed circuit of the present invention will be described in the context of a hard disk drive system using a rotary head actuator carriage. As is shown in FIG. 1, the hard disk drive system 10 has an outer housing 12 formed of a lower plate 13 and a cover (shown in broken lines) between which the data storage disk(s) 14, actuator assembly 16, and other components of the data storage system are contained. In the illustrative embodiment, an actuator spindle 18 is mounted on an actuator base plate 20 which permits pivotal movement of the actuator assembly 16.

As is best shown in FIG. 1, a plurality of heads, such as head 22, are supported on the actuator assembly 16. These heads are adapted to write data onto respective disks 14 and read data from the disks. Each head 22 is supported by a flexure element 24 which extends from the distal end 26 of an actuator carriage or arm 28.

An actuator motor 30 is mounted on the actuator carriage 28, the motor including permanent magnets (not shown) fixed on the actuator base plate 20 and a coil sandwiched therebetween. The coil and the permanent magnets comprise a voice coil motor ("VCM") which produces a force of predetermined varying amounts due to the current supplied to the coil. In response to this force, the actuator carriage 16 is driven in clockwise or counterclockwise directions about spindle 18 to move the heads 22 across the disk surfaces from the outer diameter of the disks to the inner diameter, to overlie a selected one of the substantially circular concentric tracks of the data storage portion of the disk on which data may be recorded or read.

Figure 2:
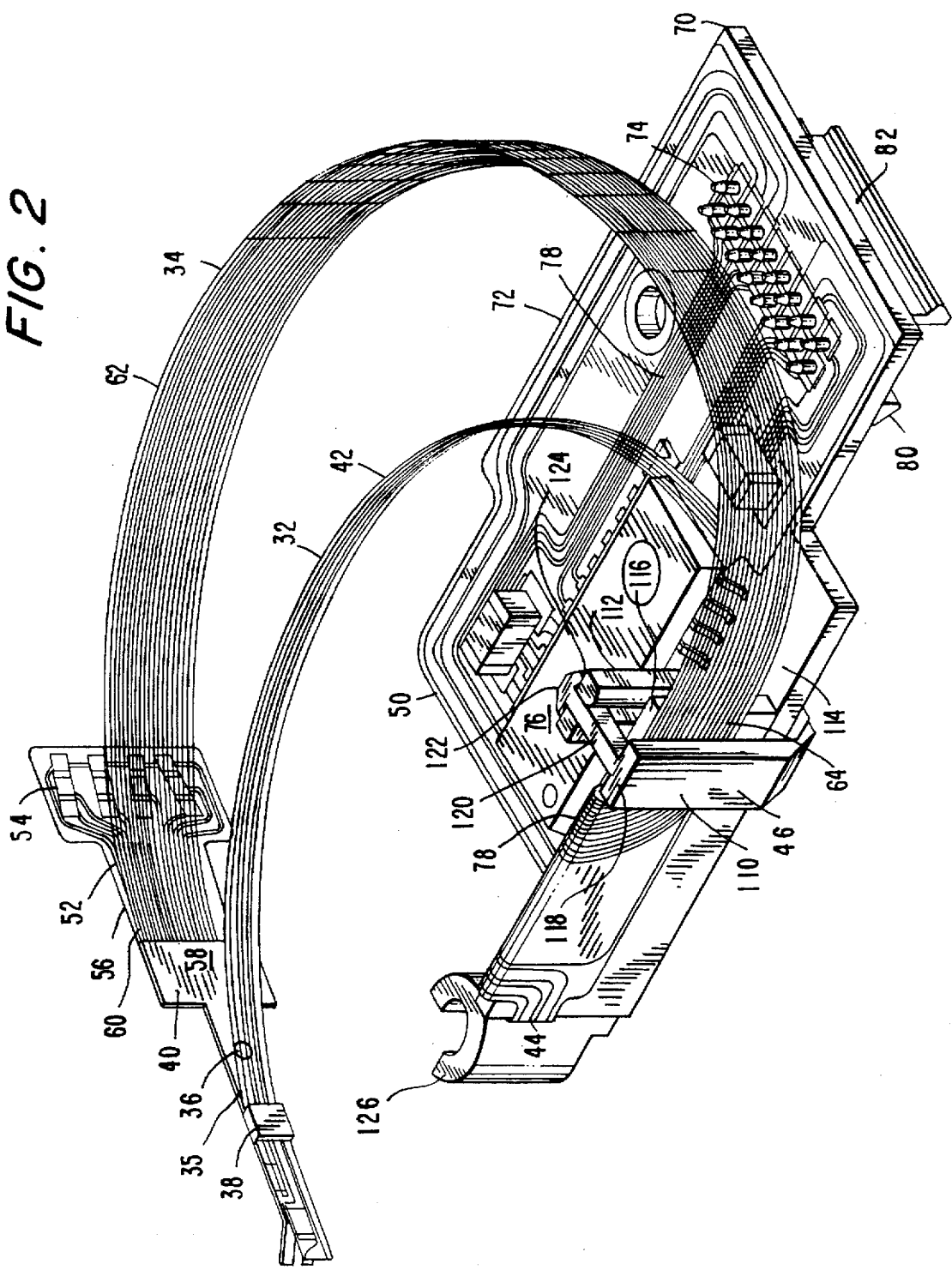
FIG. 2 is an enlarged perspective view of the flexible circuit assembly of FIG. 1.

In a hard or Winchester disk storage system employing a rotary actuator, a flexible circuit typically interconnects the read/write heads, servo lines, electrical ground line and the actuator coil for providing communication with processing or servo-related electronics. In one preferred embodiment of the present invention, as is shown in FIGS. 1 and 2, in order to separate signal traces, the flexible circuit is split into two sets of flexlead conductors 32 and 34 wherein flexlead 32 supplies power and ground to the VCM and flexlead 34 transmits signals to and from the read/write heads 22. This dual flexlead design reduces signal interference for the relatively low level read/write signals. The flexible circuit also includes a printed circuit 50 having respective connecting traces 72 and 78 electrically connected to the flexlead 32 and 34 and an integrated circuit 76 which is mounted on the printed circuit 50.

As is shown in FIGS. 1 and 2, the flexlead 32 supplying power and ground to the VCM is mounted at one end 35 thereof to the actuator arm 28 by a pin 36 that is press-fit onto the actuator arm with the flexlead 32 soldered thereto. The flexlead 32 is tightly constrained adjacent to the actuator arm by a mounting bracket 38 formed on an attachment member 40 press-fit as well to the actuator arm by pin 36. As it extends away from the actuator arm, the flexlead 32 is in the form of a loop 42. As will be set forth in further detail below, the end 44 of the loop 42 of the flexlead opposite to the end 35 mounted to the actuator arm extends through a flexlead damping mechanism 46 until the leads thereof are electrically joined to mating circuitry on a printed circuit 50.

The other flexlead 34, which transmits signals to and from the read/write heads 22, is mounted to the actuator arm at one end 52 thereof to a connector 54 which is disposed on the actuator arm. The flexlead 34 then extends inwardly as at point 56 until it is constrained from further inward movement by an enlarged section 58 of attachment 40 which is approximately the same width as the width of flexlead 34. The flexlead 34 is then angled outwardly as at 60 in the form of a loop 62 extending away from the actuator assembly. The end 64 of flexlead 34 opposite to end 52 extends through flexlead damping member 46 until it is electrically joined to mating circuitry on the printed circuit 50 as will be described in further detail below.

By utilizing a dual flexlead design, the bias force created on the actuator arm by one flexlead is balanced by the bias force created on the actuator arm by the other flexlead. In order to achieve this balancing effect, the pair of flexleads 32 and 34 is mounted to the actuator arm on opposite sides of the pivot point 18 of the actuator arm 28. More specifically, as is illustrated in FIG. 1, the connection point of flexlead 32 (i.e., whereat the pin 36 is press-fit onto the actuator arm 28) is rearwardly of the pivot point 18 whereas the connection point of flexlead 34 (i.e., whereat flexlead 34 is joined to the connector 54) is forwardly of the pivot point 18. In general, the bias force exerted by a flexlead, such as 32 and 34, upon the actuator arm is related to the distance of the flexlead from the pivot point of the actuator and the relative stiffness of the flexlead loop. In view thereof, the connection point of the flexleads 32 and 34 to the actuator arm 28 is such that the flexleads "push" the arm on opposite sides thereof, thereby canceling the forces exerted by each other and negating the net bias force exerted on the arm to zero.

As will be described in further detail below, the printed circuit 50 is formed on a flexible substrate 70 formed of plastic or plastic-like material which is snap-fit to the lower plate 13 of the housing to thereby not only support printed circuit 50 within housing 12, but also provide mechanical support for the flexible circuit. The signal traces along the ends 35 and 64 of each respective flexlead 32, 34 are integrally formed with and provide signal communication with signal traces provided on the printed circuit 50. More specifically, the signal traces from the flexlead 32 are electrically joined to traces 72 in the printed circuit 50. These signal traces 72 are, in turn, electrically joined to a multi-pin conductor 74 formed in substrate 70.

The signal traces at end 64 of flexlead 34 are electrically connected by connecting traces 78 (see FIG. 2) to an integrated circuit 76 mounted on the printed circuit which provides for processing of the read/write signals. The connecting traces 78 supplying ground can also be electrically connected to the lower plate 13. After being processed by integrated circuit 76, the read/write signals are coupled by further signal traces 78 in the printed circuit 50 to the multi-pin connector 74.

Although the printed circuit 50 is illustrated herein as being applicable in conjunction with the double flexlead design discussed herein, it will be appreciated that the printed circuit of the present invention can also be utilized with conventional single flexlead design.

As is best shown in FIGS. 2 through 5, the substrate 70 includes a plurality of clips 80 and 82 extending downwardly therefrom which form a snap hinge. These clips are received and snap-fit within a receiving opening 86 (see FIG. 3) of the lower plate 13 to reliably mount printed circuit 50 within the housing. Another solid vertical extension member 84 extends downwardly from substrate 70 between clips 80 and 82 which assists in properly aligning the clips 80 and 82 within the receiving opening 86. The clips 80 and 82 and the vertical extension member 84 extend below the substrate section on which the multi-pin connector 74 is mounted.

Each of the clips 80 and 82 includes a respective camming surface 88 and 90 which rides against a respective upper edge 94 of receiving opening 86 (see FIGS. 3 and 4) to force the clips inwardly toward each other in the direction of arrows a such that each of the clips may extend through receiving opening 86. Clips 80 and 82 also include respective flange surfaces 95a and 95b extending laterally outwardly to an end 96a and 96b of the respective camming surfaces. These flange surfaces engage the lower plate as at points 97a and 97b to snap-fit the substrate to the lower plate of the housing when the clips 80 and 82 are cammed outwardly after extending through receiving opening 86 (see FIG. 4). In this retained and latched position of FIG. 4, the leads 100 of the multi-pin connector 74 on the underside of substrate 70 may be joined to mating connections on the disk drive system printed circuit board (not shown). As a result of this snap-fit design, the flexible circuit can be assembled in the disk drive housing by automation.

In accordance with one of the general objects of the present invention, means are provided in this data storage system for preventing contaminants from entering the disk drive environment through receiving opening 86. More specifically, in order to seal substrate 70 to lower plate 13 of the housing 12, lower plate 13 includes a recessed surface 102 (see FIG. 3) surrounding receiving opening 86 along top surface 103 thereof (see FIGS. 2 and 3). The recessed surface 102 is contoured to accept sealing means in the form of a gasket pad 104 (see FIGS. 3 through 5) surrounding the clips 80 and 82 and vertical extension member 84 of substrate 70 for sealing the substrate to the lower plate when the clips 80 and 82 and vertical extension member 84 are received and retained within the receiving opening 86 (see FIG. 4). This gasket pad also provides a biasing force to retain the substrate in a predetermined fixed position within housing 12 as the gasket pad also compensates for any slack created due to variations in tolerances between the receiving opening 86 and the snap-hinge formed of clips 80 and 82, that is, differences from disk drive to disk drive in the length of clips 80 and 82 and the thickness of lower plate 13.

As aforementioned, a flexlead damping mechanism 46 is provided within the disk drive housing and is formed integrally with substrate 70. This flexlead damping mechanism 46 captures and retains flexleads 32 and 34 such that they assume their desired predetermined orientation within the housing (i.e., at generally a right angle to the lower plate 13). More specifically, as is best shown in FIGS. 1 and 2, the flexlead damping mechanism includes a pair of vertical support members 110 and 112 extending upwardly from a support platform 114 of substrate 70, and a flange member 116 extending upwardly from support platform 114 which is received within the pair of vertical support members 110 and 112. As a result of this construction, each of the flexleads 32 and 34 is captured and retained between the flange member 116 and a respective one of the pair of vertical support members 110 and 112. FIG. 1 illustrates that the flexlead 32 supplying power and ground to the VCM extends between vertical support member 112 and flange member 116 and the flexlead 34 coupling the read/write and servo signals extends between vertical support member 110 and flange member 116. In order to tightly constrain each of the flexleads 32 and 34 between the flange member and the respective vertical support member, a top end 118 of vertical support member 110 includes a clamping member 120 having a clip 122 is received by and retained within a notch 124 formed on the top of vertical support member 112 to pull the vertical support members 110 and 112 inwardly toward one another. As a result of this flexlead damping mechanism, a service loop in the flexleads is created that further minimizes the bias forces on the actuator arm.

In order to assist in properly positioning substrate 70 within housing 12, the substrate 70 includes an integrally formed mounting collar 126 which extends upwardly from the substrate and is fitted on a support post 128 extending upwardly from actuator base plate 20 (see FIG. 1). This mounting collar is formed of the same plastic or plastic-like material as the substrate 70 so as to be insulated from the flexlead assembly.

As a result of the foregoing, a data storage system has been provided which balances the inherent bias force exerted on the actuator arm by the flexible circuit connected thereto. A data storage system has also been provided with a printed circuit that is associated with the flexible circuit and provides mechanical support for the flexible circuit to retain the flexible circuit in its desired predetermined orientation within the housing. Moreover, this printed circuit is adequately sealed with respect to the disk drive housing and system printed circuit board of the data storage system.

While the present invention has been particularly shown and described with reference to certain preferred embodiments, it will be readily apparent to those of ordinary skill in the art that various changes and modifications may be made therein without departing from the spirit and scope of the invention. It is intended that the appended claims be interpreted as including the foregoing as well as various other such changes and modifications.

What is claimed is:

1. A disk drive apparatus comprising:

a housing including a cover and a dower plate, said cover and said lower plate defining an enclosed region therebetween;

at least one storage disk rotatably mounted within said housing;

an actuator arm pivotable about a pivot point;

at least one transducer head mounted to a flexure element which is mounted on said actuator arm for reading and writing data from said disk;

drive means for driving said actuator arm; and a printed circuit being located within said enclosed region formed between said cover and said lower plate and to which is connected a flexlead assembly comprised of first electrical conductors for coupling drive energy to said drive means and second electrical conductors for coupling control signals and information signals between said transducer head and system circuitry wherein said first and second electrical conductors are formed as a pair of flexleads wherein one of said flexleads supplies power and around to said drive means and the other of said flexleads transmits signals to and from said transducer head, said printed circuit being formed of a substrate which is snap-fit to said lower plate thereby providing for means for supporting said printed circuit within said enclosed region and means for providing mechanical support for said flexlead assembly within said enclosed region, wherein said substrate includes a plurality of clips extending downwardly therefrom, said clips being received and snap-fit within a receiving opening of said lower plate to reliably mount said printed circuit within said enclosed region, said lower plate including a recessed surface surrounding said receiving opening along a top surface thereof, said recessed surface being contoured to accept sealing means surrounding said clips for sealing said substrate to said lower plate and for providing a bias force to retain said substrate in a predetermined fixed position within said housing, said snap-fit clips providing means for exerting a sealing force on said printed circuit and said sealing means to establish a tight seal therebetween;

flexlead mounting means provided within said housing for negating an inherent bias force exerted on said actuator by said pair of flexleads, said flexlead mounting means further including flexlead damping means disposed on said substrate for capturing and retaining said pair of flexleads within said housing such that said flexleads assume an orientation with said housing to negate the inherent bias force exerted on said actuator by said pair of flexleads wherein said flexlead damping means includes a pair of vertical support members and a flange member extending upwardly from said substrate and positioned between said pair of vertical support members, whereby each of said flexleads is captured and retained between said flange member and a respective one of said pair of vertical support members and wherein an end of one of said vertical support members includes a clamping member and an end of the other of said vertical support members includes a notch for receiving said clamping member to tightly constrain each of said flexleads between said flange member and a respective one of said vertical support members.

2. The disk drive apparatus of claim 1 wherein said sealing means is a gasket pad.

3. A disk drive apparatus comprising:

a housing including a cover and a lower plate, said cover and said lower plate defining an enclosed region therebetween;

at least one storage disk rotatably mounted within said housing;

an actuator arm pivotable about a pivot point;

at least one transducer head mounted to a flexure element which is mounted on said actuator arm for reading and writing data from said disk;

driving means for driving said actuator arm; and a printed circuit being located within said enclosed region formed between said cover and said lower plate and to which is connected a flexlead assembly comprised of first electrical conductors for coupling drive energy to said drive means and second electrical conductors for coupling control signals and information signals between said transducer head and system circuitry wherein said first and second electrical conductors are formed as a pair of flexleads wherein one of said flexleads supplies power and ground to said drive means and the other of said flexleads transmits signals to and from said transducer head, said printed circuit being formed on a substrate which is snap-fit to said lower plate thereby providing for means for supporting said printed circuit within said enclosed region and means for providing mechanical support for said flexlead assembly within said enclosed region, wherein said substrate includes a plurality of clips extending downwardly therefrom, said clips being received and snap-fit within a receiving opening of said lower plate to reliably mount said printed circuit within said enclosed region, said lower plate including a recessed surface surrounding said receiving opening along a top surface thereof, said recessed surface being contoured to accept sealing means surrounding said clips for sealing said substrate to said lower plate and for providing a bias force to retain said substrate in a predetermined, fixed position within said housing, said snap-fit clips providing means for exerting a sealing force on said printed circuit and said sealing means to establish a tight seal therebetween;

flexlead mounting means provided within said housing for negating an inherent bias force exerted on said actuator arm by said pair of flexleads, said flexlead mounting means further including flexlead damping means disposed on said substrate for capturing and retaining said pair of flexleads within said housing, said flexlead damping means including a pair of vertical support members and a flange member extending upwardly from said substrate and positioned between said pair of vertical support members wherein an end of one of said vertical support members includes a clamping member and an end of the other of said vertical support members includes a notch for receiving said clamping member to tightly constrain each of said flexleads between said flange member and a respective one of said pair of vertical support members.

4. The disk drive apparatus of claim 3 wherein said drive means is a voice coil motor.

5. The disk drive apparatus of claim 3 wherein each said clip includes a camming surface which rides against a respective upper edge of said receiving opening to force said clips inwardly toward each other to enable each said clip to extend through said opening.

6. The disk drive apparatus of claim 5 wherein each said clip includes a flanged surface extending laterally outwardly at an upper end of each of said camming surfaces, said flanged surface engaging a corresponding raised member extending below the lower edge of said receiving opening to snap-fit said substrate to said lower plate.

7. The disk drive apparatus of claim 3 wherein said sealing means is a gasket pad.

8. The disk drive apparatus of claim 3 wherein said substrate is flexible and formed of a plastic or plastic-like material.

9. The disk drive apparatus of claim 3 wherein said snap-in substrate is connected at one end thereof to at least said second electrical conductors.

10. The disk drive apparatus of claim 3 wherein said flexlead mounting means includes connection means for mounting the pair of flexleads to said actuator arm on opposite sides of said pivot point in an orientation to permit the net bias force exhibited on said actuator arm to be reduced to zero.

11. The disk drive apparatus of claim 10 wherein said connection means includes a connector mounted to said actuator arm and to which one of said flexleads is connected, and a pin press-fit onto said actuator arm for mounting the other of said flexleads to said actuator.

12. The disk drive apparatus of claim 3 further including an actuator base plate for supporting said drive means and said actuator arm within said housing.

13. The disk drive apparatus of claim 12 wherein said substrate includes an integrally-formed mounting collar extending upwardly therefrom for fitting on a support post extending upwardly from said actuator base plate to position said substrate within said housing.

14. The disk drive apparatus of claim 13 wherein said mounting collar is insulated from said first and second electrical conductors.

15. The disk drive apparatus of claim 3 wherein said printed circuit further includes an integrated circuit mounted thereon for processing signals produced by said at least one transducer head.

16. A disk drive apparatus comprising:

a housing including a cover and a lower plate, said cover and said lower plate defining an enclosed region therebetween;

at least one storage disk rotatably mounted within said housing;

an actuator arm pivotable about a pivot point;

at least one transducer head mounted to a flexure element which is mounted on said actuator arm for reading and writing data from said disk;

drive means for driving said actuator arm; and a printed circuit being located within said enclosed region formed between said cover and said lower plate and to which is connected a flexlead assembly comprised of first electrical conductors for coupling drive energy to said drive means and second electrical conductors for coupling control signals and information signals between said transducer head and system circuitry wherein said first and second electrical conductors are formed as a pair of flexleads wherein one of said flexleads supplies power and ground to said drive means and the other of said flexleads transmits signals to and from said transducer head, said printed circuit being formed on a substrate which is snap-fit to said lower plate thereby providing for means for supporting said printed circuit within said enclosed region and means for providing mechanical support for said flexlead assembly within said enclosed region, wherein said substrate includes a plurality of clips extending downwardly therefrom, said clips being received and snap-fit within a receiving opening of said lower plate to reliable mount said printed circuit within said enclosed region, said lower plate including a recessed surface surrounding said receiving opening along a top surface thereof, said recessed surface being contoured to accept sealing means surrounding said clips for sealing said substrate to said lower plate and for providing a bias force to retain said substrate in a predetermined, fixed position within said housing, said snap-fit clips providing means for exerting a sealing force on said printed circuit and said sealing means to establish a tight seal therebetween;

flexlead mounting means provided within said housing for negating an inherent bias force exerted on said actuator arm by said pair of flexleads, said flexlead mounting means further including flexlead damping means disposed on said substrate for capturing and retaining said pair of flexleads within said housing, said flexlead damping means including a pair of vertical support members and a flange member extending upwardly from said substrate and positioned between said pair of vertical support members wherein an end of one of said vertical support members includes a clamping member and an end of the other of said vertical support members includes a notch for receiving said clamping member to tightly constrain each of said flexleads between said flange member and a respective one of said pair of vertical support members.

17. A disk drive apparatus comprising:

a housing including a cover and a lower plate, said cover and said lower plate defining an enclosed region therebetween;

at least one storage disk rotatably mounted within said housing;

an actuator arm pivotable about a pivot point;

at least one transducer head mounted to a flexure element which is mounted on said actuator arm for reading and writing data from said disk;

drive means for driving said actuator arm;

a printed circuit being located within said enclosed region formed between said cover and said lower plate and to which is directly connected a flexlead assembly comprised of first electrical conductors for coupling drive energy to said drive means and second electrical conductors for coupling control signals and information signals between said at least one transducer head and system circuitry wherein said first and second electrical conductors are formed as a pair of flexleads wherein one of said flexleads supplies power and ground to said drive means and the other of said flexleads transmits signals to and from said transducer head, said printed circuit being formed on a substrate which is snap-fit to said lower plate thereby supporting said printed circuit within said enclosed region wherein said snap-in substrate is part of and provides mechanical support for flexible circuit means connected at one end thereof to at least said second electrical conductors; and flexlead mounting means provided within said housing for negating an inherent bias force exerted on said actuator arm by said pairs of flexleads, said flexlead mounting means further including flexlead damping means disposed on said substrate for capturing and retaining said pair of flexleads within said housing such that said flexleads assume an orientation within said housing to negate the inherent bias force exerted on said actuator arm by said pair of flexleads, said flexlead damping means including a pair of vertical support members and a flange member extending upwardly from said substrate and positioned between said pair of vertical support members, whereby each of said flexleads is captured and retained between said flange member and a respective one of said pair of vertical support members and wherein an end of one of said vertical support members includes a clamping member and an end of the other of said vertical support members includes a notch for receiving said clamping member to tightly constrain each of said flexleads between said flange member and a respective one of said pair of vertical support members.

18. A disk drive apparatus comprising:

a housing including a cover and a lower plate;

at least one storage disk rotatably mounted within said housing;

an actuator arm pivotable about a pivot point;

at least one transducer head mounted to a flexure element which is mounted on said actuator arm for reading and writing data from said disk;

drive means for driving said actuator arm;

a printed circuit including first electrical conductors for coupling drive energy to said drive means and second electrical conductors for coupling control signals between said transducer head and system circuit, wherein said first and second electrical conductors being formed as a pair of flexleads wherein one of said flexleads supplies power and ground to said drive means and the other of said flexleads transmits signals to and from said transducer head, said printed circuit being formed on a substrate which is snap-fit to said lower plate thereby supporting said printed circuit within said housing; said snap-in substrate is part of and provides mechanical support for flexible circuit means connected at one end thereof to at least said second electrical conductors; and flexlead mounting means provided within said housing for negating an inherent bias force exerted on said actuator arm by said pair of flexleads, said flexlead mounting means further including flexlead damping means disposed on said substrate for capturing and retaining said pair of flexleads within said housing such that said flexleads assume a predetermined orientation within said housing to negate the inherent bias force exerted on said actuator arm by said pair of flexleads, said flexlead damping means including a pair of vertical support members and a flange member extending upwardly from said substrate and positioned between said pair of vertical support members, whereby each of said flexleads is captured and retained between said flange member and a respective one of said pair of vertical support members and wherein an end of one of said vertical support members includes a clamping member and an end of the other of said vertical support members includes a notch for receiving said clamping member to tightly constrain each of said flexleads between said flange member and a respective one of said pair of vertical support members.

19. A disk drive apparatus comprising:

a housing including a cover and a lower plate;

at least one storage disk rotatably mounted within said housing;

an actuator arm pivotable about a pivot point;

at least one transducer head mounted to a flexure element which is mounted on said actuator arm for reading and writing data from said disk;

drive means for driving said actuator arm; and a printed circuit to which is directly connected a flexlead assembly comprised of first electrical conductors for coupling drive energy to said drive means and second electrical conductors for coupling control signals and information signals between said transducer head and system circuitry, wherein said first and second electrical conductors being formed as a pair of flexleads wherein one of said flexleads supplies power and ground to said drive means and the other of said flexleads transmits signals to and from said transducer head, said printed circuit being formed on a substrate which is snap-fit to said lower plate thereby supporting said printed circuit within said housing, said snap-in substrate is part of a provides mechanical support for flexible circuit means connected at one end thereof to at least said second electrical conductors; and flexlead mounting means provided within said housing for negating an inherent bias force exerted on said actuator arm by said pair of flexleads, said flexlead mounting means further including flexlead damping means disposed on said substrate for capturing and retaining said pair of flexleads within said housing such that said flexleads assume a predetermined orientation within said housing to negate the inherent bias force exerted on said actuator arm by said pair of flexleads, said flexlead damping means including a pair of vertical support members and a flange member extending upwardly from said substrate and positioned between said pair of vertical support members, whereby each of said flexleads is captured and retained between said flange member and a respective one of said pair of vertical support members and wherein an end of one of said vertical support members includes a clamping member and an end of the other of said vertical support members includes a notch for receiving said clamping member to tightly constrain each of said flexleads between said flange member and a respective one of said pair of vertical support members.

20. A disk drive apparatus comprising:

a housing including a cover and a lower base plate with said lower base plate having a generally flat inner surface;

at least one storage disk rotatably mounted within said housing; and an actuator assembly including:

an actuator arm having a pivot shaft supported by a lower yoke plate and an upper yoke plate located above said lower yoke plate, said actuator arm being pivotable about an axis of said pivot shaft;

at least one transducer head mounted on said actuator arm for reading and writing data from said storage disk;

an actuator motor for driving said actuator arm including:

a coil attached to said actuator arm; and a magnetic circuit including:

said lower yoke plate placed on said flat inner surface of said lower base plate of said housing;

said upper yoke plate placed above said lower yoke plate;

a permanent magnet located between said lower yoke plate and said upper yoke plate; and a post provided with said lower yoke plate at a predetermined position of said lower yoke plate and projected toward said upper yoke plate; and a printed circuit including a flat lead having an electrical conductor coupling control signals and information signals between said at least one transducer and system circuitry, said flat lead of said printed circuit having a first end and a second end, said first end of said flat lead of said printed circuit being connected to said actuator arm;

a plastic flat plate, having a first flat surface and a second flat surface opposed to said first surface, located on said flat inner surface of said lower base plate of said housing such that said second surface of said plastic flat plate is parallel to said flat inner surface of said lower plate of said housing, said printed circuit being provided on said plastic flat plate;

a guide member, integrally formed with said plastic flat plate, extending from said plastic flat plate perpendicular to said first flat surface of said plastic flat plate, said guide member holding said flat lead of said printed circuit at said second end of said flat lead of said printed circuit such that said flat lead of said printed circuit is parallel to said guide member of said plastic flat plate and such that said flat lead of said printed circuit forms between said first end of said flat lead of said printed circuit and said second end thereof a curved loop which imparts a rotational torque to said actuator arm; and a holding member, integrally formed with said plastic flat plate, having a collar at a free end of said holding member, said collar of said holding member being engaged with said post of said lower yoke plate.

* * * * *

UNITED STATES PATENT AND TRADEMARK OFFICE
CERTIFICATE OF CORRECTION

PATENT NO. :  5,717,541

DATED      :  February 10, 1998

INVENTOR(S) :  Ycas et al.

It is certified that error appears in the above-identified patent and that said Letters Patent is hereby corrected as shown below:

Claim 1, Column 8, line 51: change "around" to --ground--.

Signed and Sealed this

Thirtieth Day of June, 1998

Attest:

BRUCE LEHMAN

Attesting Officer

Commissioner of Patents and Trademarks